Sept. 30, 1969  R. HASWELL  3,469,924
OPTICAL INTERFEROMETERS
Filed Jan. 4, 1966

3,469,924
OPTICAL INTERFEROMETERS
Ronald Haswell, Newcastle-upon-Tyne, England, assignor to Sir Howard Grubb Parsons & Company Limited, Newcastle-upon-Tyne, England, a British company
Filed Jan. 4, 1966, Ser. No. 518,634
Claims priority, application Great Britain, Jan. 5, 1965, 369/65
Int. Cl. G01b 9/02
U.S. Cl. 356—106      6 Claims

ABSTRACT OF THE DISCLOSURE

An optical interferometer comprising a source of radiation, a detector, means defining three beam paths for said radiation, means for focussing each beam path upon said detector, means for producing interference between two of said beam paths, and beam switching means for interrupting the beams whereby the detector receives alternately radiation from the two interfering beams combined and from the third beam alone.

---

Figure 1:
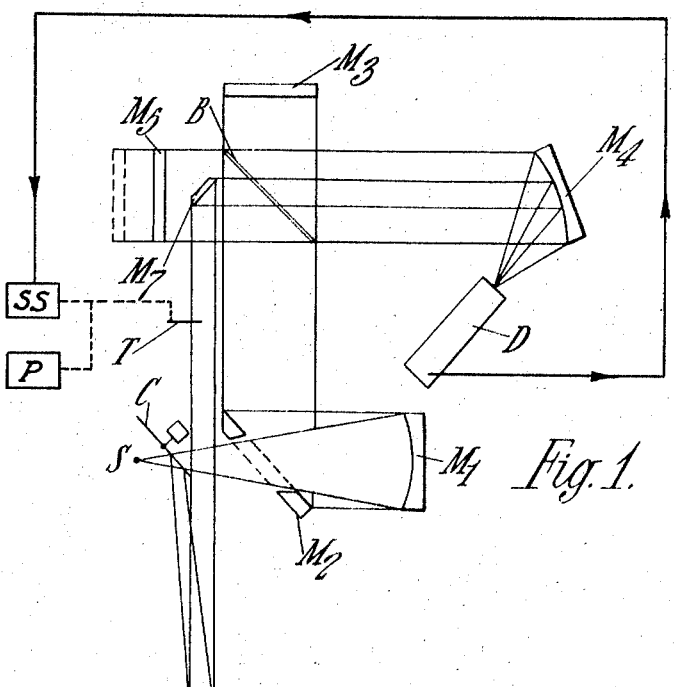

This invention relates to optical interferometers of the kind used in the spectrometric analysis of fluids and solids.

A typical optical interferometer is the Michelson Interferometer in which radiation from a source passing through an aperture, preferably circular, is collimated and directed onto a sheet of semi-transparent material set at a preferred angle of 45° to the collimated beam. One part of the radiation passes through the sheet and is received by a fixed plane mirror from which it is reflected back onto the sheet and thence onto a beam condensing system which focusses the radiation on a detector. The other part of the radiation directed onto the semi-transparent sheet does not pass through, but is reflected onto a movable plane mirror from which it is reflected back through the sheet and then onto the same condensing system to be focussed on the detector. The radiation is interrupted at regular intervals by a beam chopper and the detector thus produces an A.C. signal.

The radiation falling on the semi-transparent sheet is thus split up so as to pass along two different beam paths before being focussed on the detector. The path length of the beam falling on the movable mirror is altered by moving the mirror parallel to itself. When the movable mirror is adjusted to make the two different beam paths equal in length all rays falling on the detector will be in phase and a strong signal is produced by the detector.

If the movable mirror is positioned so that a difference in length, $x$ cm., exists between the two beam paths, the rays of a certain wavelength in one beam will not in general be in phase with corresponding rays in the other beam, the magnitude of the resulting phase difference being inversely proportional to the wavelength. As the magnitude of the path difference increases from zero the magnitude of the signal from the detector fluctuates about a mean value, the amplitude of the fluctuation tending to decrease as the path difference increases. A plot of the fluctuation of the output signal from the detector against movement of the movable mirror from the position where the path lengths are equal is known as an "interferogram" and may be used to deduce the wavelength distribution of radiation from the source or, by placing a sample in the path of the radiation before it reaches the detector, the absorption characteristics of the sample may be determined.

It is well known from mathematical theory that the Fourier transformation of the interferogram $I(x)$ is the spectral distribution $G(k)$, where $k$ is frequency in cm.$^{-1}$, and if the interferogram is symmetrical with respect to zero path difference it is permissible to use the cosine transform:

$$G(k) = \int_0^\infty I(x) \cos 2\pi kx \, dx$$

More conveniently one uses the equation $$G(k) = \int_0^{x_1} I(x) \cos 2\pi kx \, dx$$

where $x_1$ is the maximum path difference employed.

One difficulty encountered with this type of instrument is that since the ordinate of the interferogram is always positive the interferogram must contain a D.C. component. Presence of a D.C. component can produce undesirable errors in the computation unless it is maintained at a constant level. This is difficult since the signal level depends on (1) energy emitted by the source (which for use between 20 and 1000$\mu$ is usually a high pressure mercury lamp), (2) amplifier gain and (3) detector sensitivity. The usual detector is a Golay cell and this is difficult to keep at a constant level of sensitivity.

Ideally, the complete interferogram can be written $I(x) + a$, where $a$ is a constant, and when the Fourier transform is computed the constant term $a$ contributes $$a \int_0^{x_1} \cos 2\pi kx \, dx = \frac{a \sin 2\pi kx_1}{2\pi k}$$

Provided that $2 kx_1$ is an integer, this term is zero and contributes nothing to $G(k)$. However, if there is a variation in any of the three factors mentioned above $a$ is not constant and $$\int_0^{x_1} a \cos 2\pi kx \, dx$$

is a variable quantity.

It is the object of the present invention to modify the interferometer in such a way that the above term is eliminated from the interferogram, and to make the interferogram essentially independent of variation in source output, amplifier gain and detector sensitivity.

The invention consists in an optical interferometer comprising a source of radiation, means defining three beam paths for said radiation and focussing each beam path on a detector, means for producing interference between two of the beam paths, and beam switching means for interrupting the beams whereby the detector receives alternately radiation from the two interfering beams combined and from the third beam alone.

The invention also consists in an optical interferometer in accordance with the preceding paragraph, in which the beam switching means are arranged to direct radiation from the source along two beam paths, radiation in one path being subsequently divided into two beam paths of interfering radiation, whilst the other constitutes the said third beam path.

The invention also consists in an optical interferometer in accordance with either of the preceding two paragraphs, in which a movable attenuator is located in the third beam path.

The invention also consists in an optical interferometer in accordance with the preceding paragraph, in which the third beam path is arranged to be continuously attenuated so as to keep the energy in the said third beam path equal, or substantially equal, to the combined energy in the interfering beam paths, the position of the attenuator being arranged to provide a signal which is a measure of the magnitude of the resultant of the two interfering beam paths of radiation.

Figure 2:
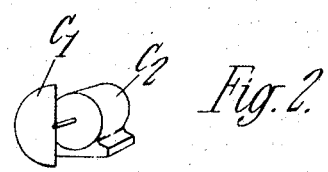
Figure 3:
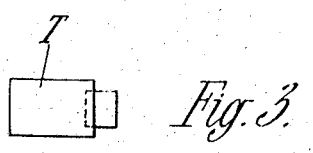

The invention also consists in an optical interferometer substantially as described herein with reference to the accompanying diagramamtic drawings in which, FIGURE 1 shows an interferometer constructed in accordance with one embodiment of the invention, FIGURE 2 shows a beam switching device, and FIGURE 3 shows a cross-section through a beam showing an attenuator in position.

In carrying the invention into effect in the form illustrated by way of example and referring first to FIGURE 1, an optical interferometer comprises an aperture S, illuminated by a source of radiation (not shown), a collimating mirror $M_1$ receiving light from aperture S and directing a collimated beam of radiation onto plane mirror $M_2$. Radiation reflected from mirror $M_2$ falls on a semi-transparent member B set at an angle of 45°, to the collimated beam. One part of the radiation passes through the member and is received by plane mirror $M_3$ from which is reflected back onto the member B and thence onto a focussing mirror $M_4$ which focusses the radiation onto a detector D. The remainder of the radiation falling on member B is reflected thereby onto a movable mirror $M_5$ which reflects it back through the member B and thence onto mirror $M_4$ which focusses it on the detector D.

The radiation falling on the member B is thus split up into two beam paths namely a first beam path which passes onto mirror $M_3$ and thence back from member B onto mirror $M_4$ and a second beam path which is reflected by member B and passes onto mirror $M_5$ and thence onto mirror $M_4$ through the member B. The path length of the second beam path is altered by moving the mirror $M_5$ parallel to itself.

The components so far described are all present in a conventional Michelson interferometer.

In accordance with the present invention a third beam path of radiation is provided from the same source as that illuminating aperture S.

The third beam path is defined by mirrors $M_6$, $M_7$ and $M_4$ and radiation from aperture S is directed onto mirror $M_6$ by beam switching device C. This device in the form illustrated in FIGURE 2 consists of a semi-circular mirror disc $C_1$ driven by a motor $C_2$. As the disc $C_1$ rotates it allows radiation to pass alternately along the beam path falling on mirror $M_1$, which is subsequently divided into two interfering beam paths as previously described, and third beam path falling on mirror $M_6$. The detector D thus receives alternately radiation from which are in effect two beam paths namely, radiation from the two interfering beam paths combined and the third beam path alone.

The detector produces an electric signal proportional to the difference of energy received from the two interfering beams combined and the third beam path. By partially obscuring one of the beam paths by means of a trimmer (not shown) the constant component of the signal from the interferometer can be cancelled out. The amount by which the trimmer need be adjusted can be determined by setting the interferometer at a path difference which is sufficiently large for the alternating component of the signal from the detector to have disappeared and then adjusting the trimmer so that the alternating signal does in fact disappear.

The reflectance of the mirror $M_7$ can be much greater than that of the member B which acts as a beam splitter so that the proportion of the beam reflected by the mirror $M_7$, that is the third beam, need only be a relatively small part of the whole.

In a further development of the invention, a double-beam servo-system as employed in infra-red spectrometers is added. Any A.C. signal from the detector D is amplified and fed to a servo-system SS which continuously varies the position of an attenuator T (shown enlarged in FIGURE 3) in the beam so as to maintain equality in energy between the third beam and the two interfering beams combined. By linking a pen device P to the attenuator T by means well-known in double beam spectrometers, an interferogram is obtained free from variations in the D.C. level and corrected to a large extent for variation in source emission, amplifier gain and detector sensitivity. The usual practice is to record the interferogram point by point on punched tape ready for processing by computer. In the development described above the output may be conveniently obtained from a D.C. supply and potentiometer linked to the said servo system and fed to an analogue to digital converter. In order to be able to blank off the greater part of the reference beam with the attenuating shutter T, it is preferable to make the cross-section of the beam rectangular as indicated in FIGURE 3. This result may be achieved by making the collimating mirror $M_6$ rectangular or by masking.

The third beam path may lie for part of its length wholly within the two interfering beams as for example when the mirror $M_7$ lies within the beam passing to mirror $M_5$. The third beam path could, however, be outside the confines of the other beam paths for the whole of its length in which case mirror $M_7$ would lie outside the confines of the beam passing to mirror $M_5$.

To obtain a transmittance spectrum it is necessary to record interferograms with and without a sample in the radiation path. The interferogram corresponding to no sample, may be called $I(x)$ and on computation an energy spectrum $G(k)$ is obtained; with sample in the path the interferogram becomes $I^1(x)$ and the computed spectrum $G^1(k)$. Transmittance of the sample is proportional to $G^1(k)/G(k)$.

The sample can be positioned immediately in front of the aperture S, but this is not always convenient and it is usually preferable to provide a primary focus prior to condensing the radiation onto the aperture S, as is the practice employed with conventional spectrometers. The sample may be positioned in the interfering beams only, or in all three beams, and in the letter case it can be placed in any appropriate position between the source and detector. A simple mathematical analysis may be carried out as follows:

Assuming that the overall sensitivity of the instrument during the recording of interferograms can be represented by functions $H(x)$ and $H^1(x)$ for background and sample respectively, and that the sample is placed in the interfering beams, we may write, to a first approximation $I(x)H(x)=yH(x)$ for background and $I(x)H^1(x)=y^1H^1(x)$ for sample.

where for any value of $x$, $y$ and $y^1$ measure the position of the attenuator (T in FIGURE 1) for background and sample, respectively. Therefore, $y=I(x)$ and $y^1=I^1(x)$ and these values are largely independent of instrument sensitivity. Provided that $y$ and $y^1$ are linearly related to attenuator position, a record of this latter gives an accurate representation of the fluctuating part of $I(x)$ or $I^1(x)$, largely corrected for variations in instrument sensitivity.

If the sample is placed in the radiation comprising all three beams, the first equation is unchanged.

$$I(x)H(x)=yH(x)$$

while the second equation becomes $$I^1(x)H^1(x)=cy^1H^1(x)$$

where $c$ is the fraction of the total energy (in the third beam) reaching the detector which is transmitted by the sample. We then have $cy^1=I^1(x)$ and this is essentially the same as before since $c$ is very nearly constant.

The means of carrying out the invention already given are only intended by way of example and many variants are possible, for example the rotating mirror C aperture S anywhere between the source of radiation on the said aperture.

Advantages of the arrangement in accordance with this invention are:

(1) Errors due to $$\left(\int_0^{x_1} \alpha \cos 2\pi kx \, dx\right)$$

not being zero are eliminated.

(2) It is no longer necessary to ensure that $2kx_1$ is an integer.

(3) The recording system is more efficiently used since the useless D.C. level which contributes no useful information is avoided.

(4) The interferogram may be more conveniently apodized since previously the constant term was also multiplied by the apodizing function and in some conditions this could introduce errors.

(5) The interferogram may be modified in any desired manner by varying amplifier gain as the path difference increases, thus making the most efficient use of the dynamic range of the signal amplifier. This is an important advantage in a practical sense since the amplitude of an interferogram is large when the path difference is small and small when the path difference is large. Consequently the amplifier has the task of accepting a very large signal in the early stages with small path difference and accurately amplifying a very small signal when the path difference is great.

(6) The digital equipment may be of much lower resolution and hence less expensive since ordinate digitisation is confined to the variable component only.

(7) The system is virtually independent of variations in source emission, detector sensitivity and amplifier gain.

I claim:

1. An optical interferometer comprising a source of radiation, a detector sensitive to all wavelengths radiated by the source, means defining three optical beam paths for said radiation, means for focussing each beam path upon said detector, means for producing interference between two of said beam paths, means for varying the length of at least one of the two interfering beam paths and thereby deriving an interferogram at said detector, and beam switching means for interrupting the beams whereby the detector receives alternately radiation from the two interfering beams combined and from the third beam alone.

2. An optical interferometer according to claim 1, wherein the beam switching means are arranged to direct radiation from the source along two paths, and means are provided for subsequently dividing the radiation in one of said beam paths into two beam paths of interfering radiations, whilst the other of said beam paths constitutes the said third beam path.

3. An optical interferometer according to claim 1, which includes a movable attenuator located in said third beam path.

4. An optical interferometer according to claim 3, which includes means for continuously adjusting said attenuator so as to keep the energy in the said third beam path substantially equal to the combined energy in the interfering beam paths, and means for deriving from the position of the attenuator a signal which is a measure of the magnitude of the resultant of the two interfering beam paths of radiation.

5. An optical interferometer according to claim 1, wherein the said third beam path lies for part of its length wholly within the two interfering beam paths.

6. An optical interferometer according to claim 1, wherein the said third beam path lies for the whole of its length outside the confines of the two interfering beam paths.

References Cited

UNITED STATES PATENTS 2,688,090  8/1954  Woodhull et al.
2,984,149  5/1961  Herscher et al.

JEWELL H. PEDERSEN, Primary Examiner

T. MAJOR, Assistant Examiner